(12) United States Patent
Lee et al.

(10) Patent No.: US 7,218,372 B2
(45) Date of Patent: May 15, 2007

(54) FABRICATION METHOD OF LIQUID CRYSTAL DISPLAY PANEL

(75) Inventors: Choong Un Lee, Kyongsangbuk-do (KR); Kyung Kyu Kang, Kyongsangnam-do (KR); Jae Deuk Shin, Kyongsangnam-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 49 days.

(21) Appl. No.: 10/679,697

(22) Filed: Oct. 7, 2003

(65) Prior Publication Data

US 2004/0114086 A1 Jun. 17, 2004

(30) Foreign Application Priority Data

Oct. 31, 2002 (KR) .................. 10-2002-0066789

(51) Int. Cl.
*G02F 1/1339* (2006.01)
(52) U.S. Cl. .................. 349/153; 349/158; 349/187
(58) Field of Classification Search ................ 349/190, 349/189, 158, 73, 74, 187, 153
See application file for complete search history.

(56) References Cited

U.S. PATENT DOCUMENTS 6,195,149 B1 * 2/2001 Kodera et al. ............ 349/187
6,239,855 B1 * 5/2001 Nakahara et al. .......... 349/153
6,864,947 B2 * 3/2005 Shiraishi .................. 349/158

FOREIGN PATENT DOCUMENTS

JP 09-325328 * 12/1997
KR 2000-0050912 8/2000

* cited by examiner

*Primary Examiner*—Thoi V. Duong
(74) *Attorney, Agent, or Firm*—Morgan, Lewis & Bockius LLP (57) ABSTRACT

The present invention discloses a method of fabricating a liquid crystal display panel including forming a plurality of first substrates having at least two different sizes and a plurality of second substrates having at least two different sizes on first and second mother substrates, respectively, forming sealant patterns on at least one of the mother substrates, attaching the first and second mother substrates to each other, forming first and second cutting lines on each of the first and second mother substrates, wherein the first cutting line for separating a first unit liquid crystal display panel, which is larger than a second unit liquid crystal display panel separated by the second cutting line, and the first cutting line is extended to the sealant pattern, separating a plurality of the first and second unit liquid crystal display panels from the attached mother substrates, and injecting a liquid crystal into the separated first and second unit liquid crystal panels.

14 Claims, 9 Drawing Sheets

FABRICATION METHOD OF LIQUID CRYSTAL DISPLAY PANEL

This application claims the benefit of Korean Application No. P2002-066789 filed on Oct. 31, 2002, which is hereby incorporated by reference.

BACKGROUND OF THE INVENTION

1. Field of the Invention

The present invention relates to a liquid crystal display device, and more particularly, to a fabrication method of a liquid crystal panel. Although the present invention is suitable for a wide scope of applications, it is particularly suitable for maximizing the use of mother substrates in fabricating unit liquid crystal display panels.

2. Discussion of the Related Art

As the times are rapidly changed into an information-oriented society, the field of display devices for processing and displaying mass information has been developed.

Cathode-ray tubes (CRTs) had been developed as a main stream of the display device in the past. However, recently, flat panel displays have drawn more attention because there are demands in characteristics, such as compact size, light-weight, and low power consumption in the display devices.

In order to meet such needs, a thin film transistor-liquid crystal display (TFT-LCD, simply referred to as a liquid crystal display hereinafter) having excellent color reproducibility and thinness has been developed.

The liquid crystal display is being more widely used as a substitute means which can overcome shortcomings of the CRT, owing to its large contrast ratio, its adaptability in displaying gray scales or moving pictures, and its low power consumption.

Figure 1:
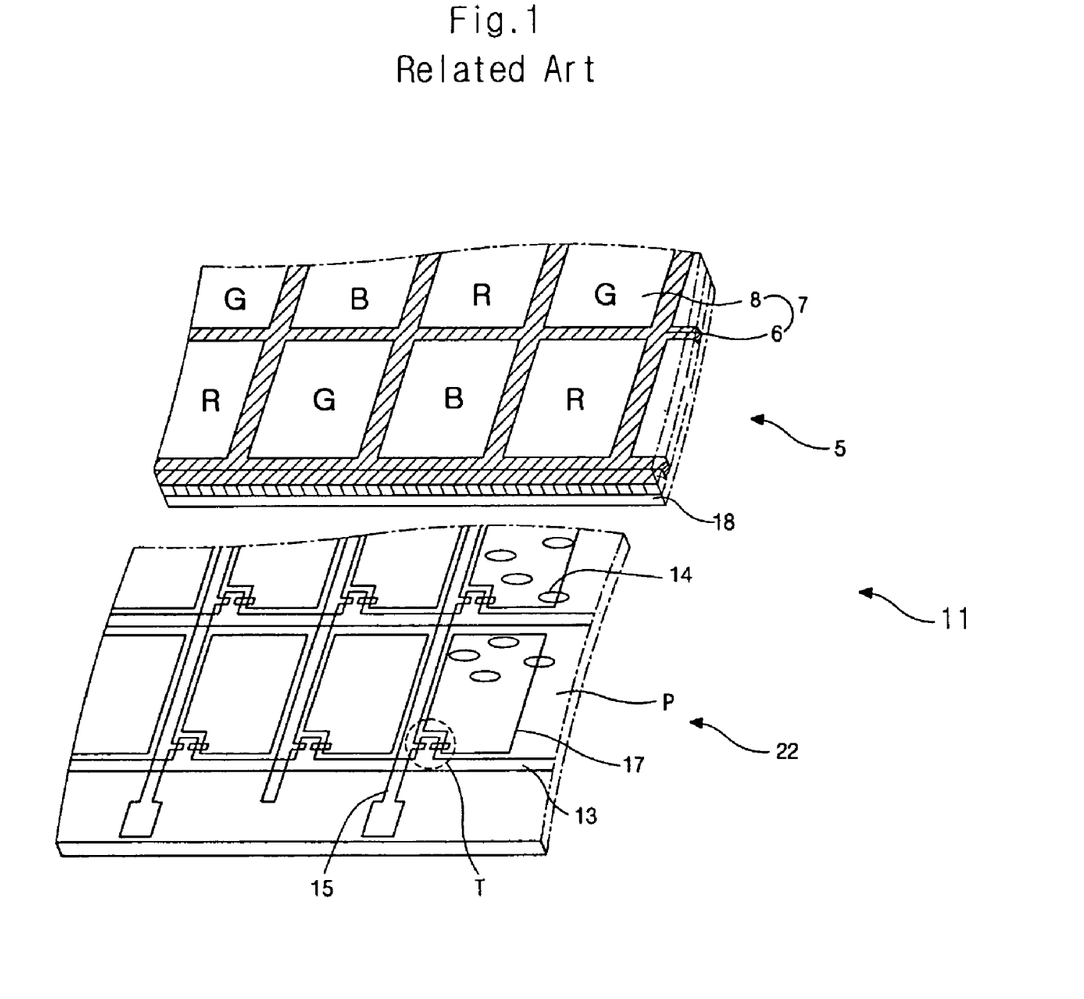
FIG. 1 is a schematic plane view showing a liquid crystal panel of a related art liquid crystal display.

FIG. 1 is a schematic plane view showing a liquid crystal panel of a related art liquid crystal display.

Referring to FIG. 1, a liquid crystal panel 11 of the related art liquid crystal display includes an upper substrate 5 with a transparent common electrode 18 formed on a color filter 7 including a black matrix 6 and sub-color filters 8, a lower substrate 22 provided with pixel regions P which are defined by pixel electrodes 17, thin film transistors as switching devices T, data lines 15, gate lines 13, and liquid crystal 14 filled between the upper substrate 5 and the lower substrate 22.

In fabricating the liquid crystal panel 11, alignment layers are formed on the upper and lower substrates. A spacer is formed on each of the upper and lower substrates by a sealant. And then, the upper and lower substrates are aligned and bonded to each other.

Subsequently, the bonded upper and lower substrates are cut to obtain a plurality of unit cells by a scribing/breaking process, the liquid crystal is injected between the upper and lower substrates, which is then sealed with a liquid crystal inlet. A polarizer is attached to one of the upper and lower substrates, and taps of a driver circuit are bonded to the upper and lower substrates.

In other words, after a plurality of upper and lower substrates, as described above, are formed on a pair of the mother glass substrates having a large area, the substrates are attached to each other by means of the sealant, and are then cut to form a plurality of liquid crystal panels.

When the liquid crystal panels formed on the large area of the mother glass substrates are cut as described above, dummy glass substrates, which are remaining portions of the mother glass substrates that are not formed on the upper and lower substrates, are formed between the liquid crystal panels. The dummy glass substrates are portions to be removed when the plurality of liquid crystal panel are cut.

Therefore, the liquid crystal panels and the dummy glass substrates must be separated from each other when the liquid crystal panels are cut.

At this time, the separation of the liquid crystal panels and the dummy glass substrates is performed through the scribing process and the breaking process.

Typically, the sealant serves to form a gap for injecting the liquid crystal and to attach the upper substrate and the lower substrate to each other.

However, a pattern of the sealant is also formed between the dummy glass substrates, which pattern serves to attach the large area of glass substrates to each other and entirely, the glass substrates being formed on the upper and lower substrates. This is for properly separating the liquid crystal panels and the dummy glass substrates when the liquid crystal panels are cut.

Recently, the liquid crystal panels having an asymmetrical size are being formed on a pair of glass substrates having large areas. In cutting such liquid crystal panels, however, small dummy glass substrates other than the aforementioned dummy glass substrates are produced. However, the small dummy glass substrates are not completely separated from the liquid crystal panels, thereby deteriorating the productivity of the liquid crystal panels.

SUMMARY OF THE INVENTION

Accordingly, the present invention is directed to a fabrication method of a liquid crystal display device that substantially obviates one or more of problems due to limitations and disadvantages of the related art.

Another object of the present invention is to provide a fabrication method of a liquid crystal display device in which small dummy glass substrates and main dummy glass substrates can be separated at the same time, by overlapping a sealant pattern with a lower portion of a cutting line formed between the small dummy glass substrates and the main dummy glass substrates, in order to separate and remove the small dummy glass substrates generated when a plurality of unit liquid crystal panels are formed in an asymmetrical size on a mother substrate.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a fabrication method of a liquid crystal display panel includes forming a plurality of first substrates having at least two different sizes and a plurality of second substrates having at least two different sizes on first and second mother substrates, respectively, forming sealant patterns on at least one of the mother substrates, attaching the first and second mother substrates to each other, forming first and second cutting lines on each of the first and second mother substrates, wherein the first cutting line for separating a first unit liquid crystal display panel, which is larger than a second unit liquid crystal display panel separated by the second cutting line, and the first cutting line is extended to the sealant pattern, separating a plurality of the first and second unit liquid crystal display panels from the attached mother substrates, and injecting a liquid crystal into the separated first and second unit liquid crystal panels.

The first and second mother substrates comprise a plurality of dummy glass substrates including main dummy glass substrates and secondary dummy glass substrates. Herein, the secondary dummy glass substrates have a width less than about 3 mm.

The sealant patterns are formed on non-display regions of the liquid crystal display panels. Herein, the sealant patterns are positioned on both the main dummy glass substrates and the secondary dummy glass substrates.

Sizes of the first and second substrates facing into each other by attaching the first and second mother substrates are equal to each other. Herein, the second substrates have a plurality of thin film transistors and a plurality of pixel electrodes, and the first substrates have a plurality of color filters and a common electrode.

In another aspect of the present invention, a method of fabricating a liquid crystal display panel includes forming a plurality of first substrates having at least two different sizes and a plurality of second substrates having at least two different sizes on first and second mother substrates, respectively, forming sealant patterns on at least one of the mother substrates, attaching the first and second mother substrates to each other, forming first and second cutting lines on each of the first and second mother substrates, and separating a plurality of first and second unit liquid crystal display panels from the attached mother substrates, wherein the attached mother substrates include main dummy glass substrates and secondary dummy glass substrates divided by the first and second cutting lines, and the sealant patterns are located to be extended to the first cutting lines between the main dummy glass substrates and the secondary dummy glass substrates.

The method further includes injecting a liquid crystal into the separated unit liquid crystal display panels.

Herein, the secondary dummy glass substrates have a width of less than about 3 mm.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 2:
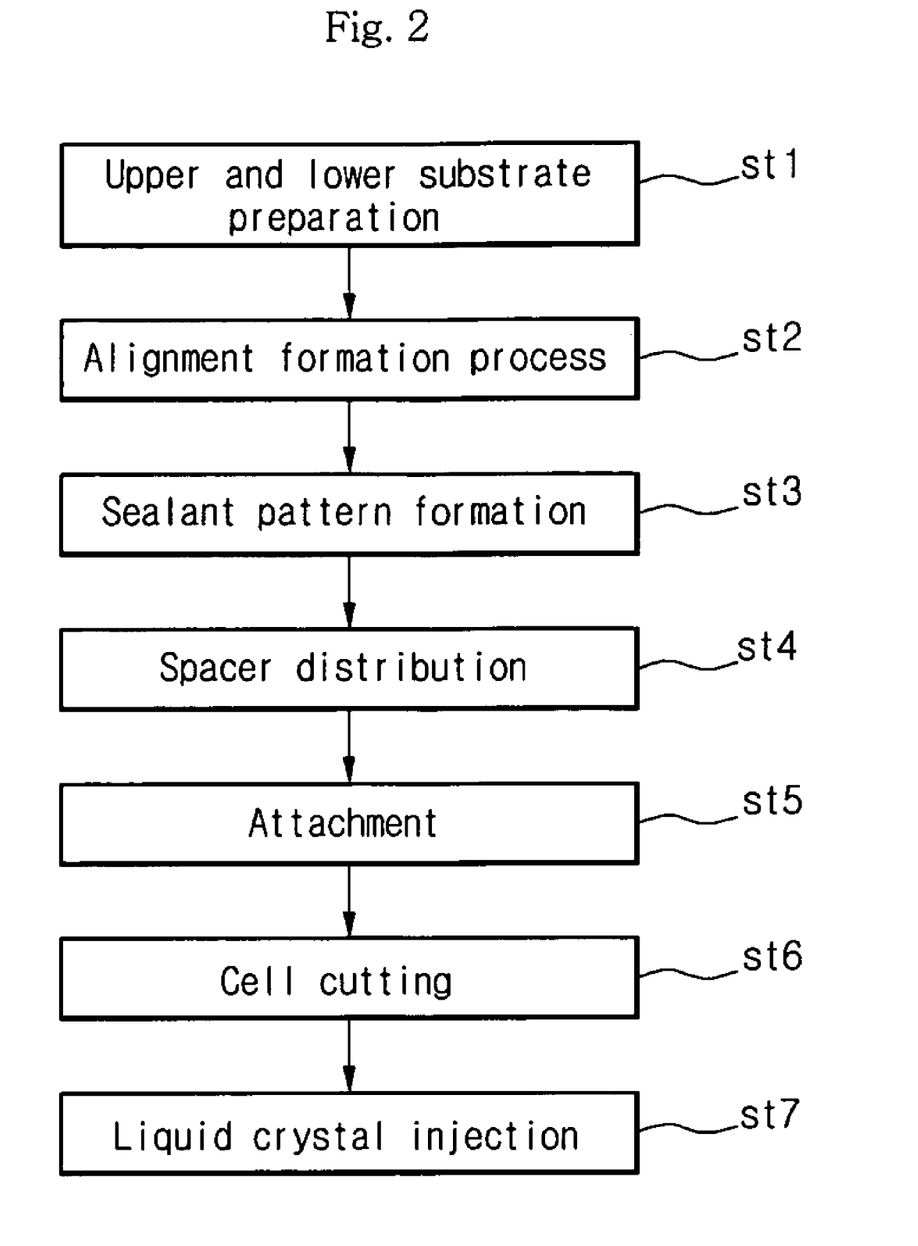
FIG. 2 is a flow chart for a fabrication process of a liquid crystal panel.

FIG. 2 is a flow chart for a fabrication process of a liquid crystal panel.

Referring to FIG. 2, in step st1, lower and upper substrates are prepared to be processed. As shown in FIG. 1, in the lower substrate, thin film transistors as switching devices are arranged in a matrix form, and pixel electrodes corresponding to the thin film transistors are formed. In the upper substrate, a transparent common electrode is formed on a color filter including a black matrix and sub-color filters. At this time, a plurality of lower substrates and a plurality of upper substrates are included on large-sized mother glass substrates.

In step st2, an alignment layer is formed on each of the upper and lower substrates. This step for forming the alignment layer includes a process for applying and rubbing a polymerized thin film, which is commonly referred to as an alignment layer. At this time, the polymerized thin film should be formed and rubbed to make a uniform thickness on the lower substrates.

In step st3, a sealant pattern is printed on one of the upper and lower substrates. The sealant pattern in the liquid crystal panel serves to provide a gap for injecting liquid crystal and to fix the upper and lower substrates in an aligned state. Also, the sealant pattern of a thermosetting resin, which is adaptable to the formation of a sealant into a desired pattern, is typically formed through a screen-printing method.

Here, the liquid crystal panel is divided into a display region and a non-display region, which is surrounded by the display region. The sealant pattern is formed on the non-display region. In addition, the sealant pattern is also formed on a portion of dummy glass substrates, which are removed when the liquid crystal panels are separated to form the mother substrates, so that the mother substrates including the upper and lower substrates are stably attached to one another.

In step st4, a spacer is distributed thereon. A spacer of a constant size is uniformly distributed on the lower substrate in order to maintain a gap between the upper and lower substrates precisely and uniformly in the fabrication process of the liquid crystal panel.

In step st5, the upper and lower substrates are attached to each other. Since the precision of alignment and attachment of the upper and lower substrates is determined by an aligner, an attachment margin should be taken into consideration when designing each substrate.

In step st6, the liquid crystal panel fabricated through steps st1 to st5 is cut into unit liquid crystal display panels. Typically, after a plurality of liquid crystal display panels are collectively formed on the large-sized mother substrates, they are separated into individual liquid crystal panels (i.e., unit liquid crystal panels). This step is called as a cell cutting process.

The cell cutting process consists of a scribing process for forming a cutting line on the surface of the substrate with a diamond pen having a hardness higher than that of the glass substrate, and a breaking process for cutting the glass substrate by applying a force.

Finally, in step st7, a liquid crystal is injected into the liquid crystal panel separated into the unit liquid crystal panels.

Hereinafter, among the above-described steps, the step of cutting the liquid crystal panel will be described in detail with reference to FIGS. 3A, 3B, and 4.

Figure 3A:
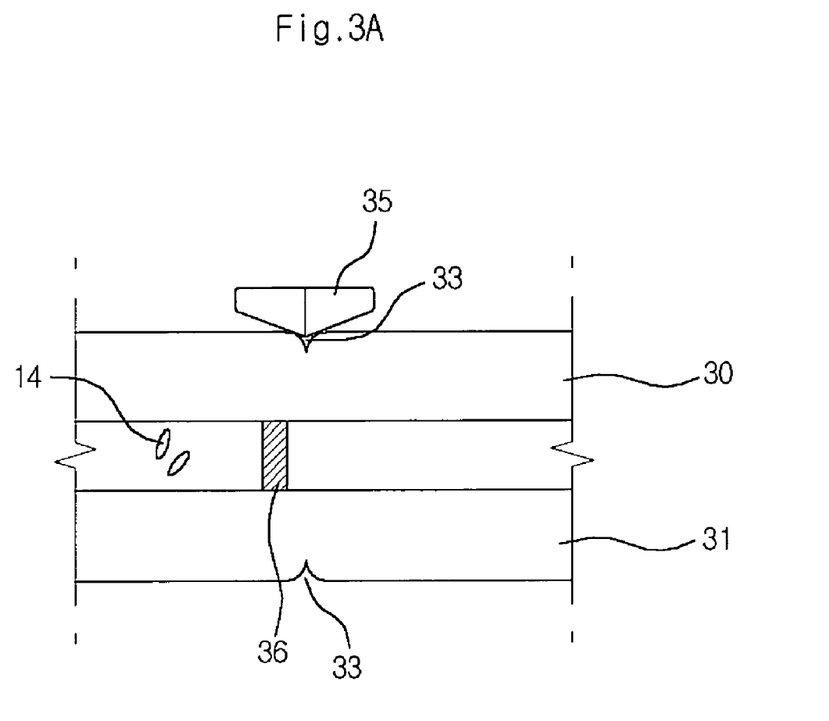
FIGS. 3A and 3B are schematic views showing a scribing process for cutting the liquid crystal panel.
Figure 3B:
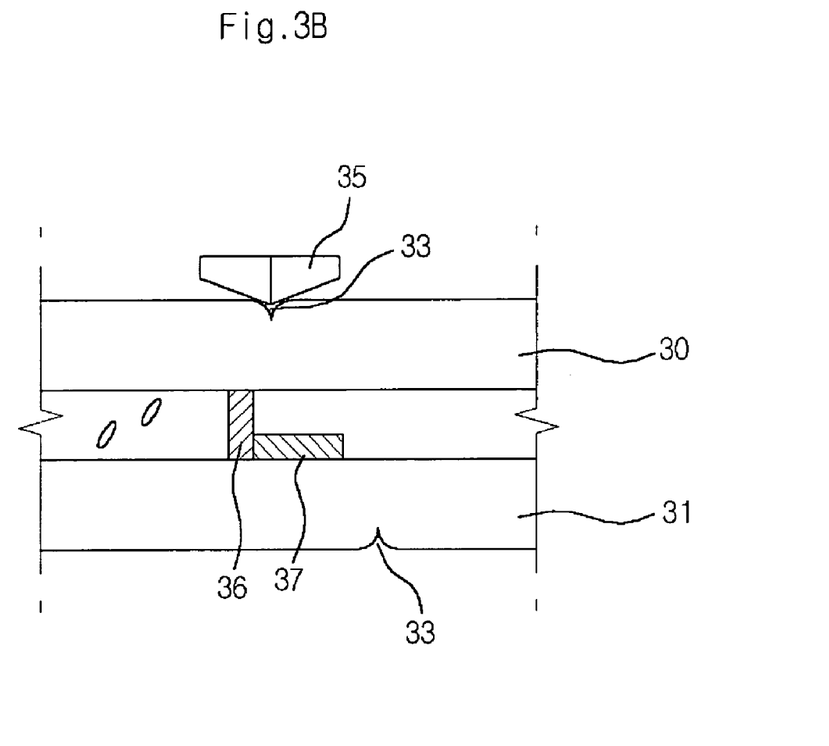

FIGS. 3A and 3B are schematic views showing a scribing process for cutting the liquid crystal panels. The scribing process is to form cutting lines 33 in a crack form on the specific surface (i.e., a cutting portion) of the glass mother substrates 30 and 31 on which the upper and lower substrates are formed. In this process, a scribing wheel 35 is rolled by a force to be contacted with the specific surface of the glass substrates.

Minute cracks are imprinted in a place through which the scribing wheel 35 passes, and the imprinted cracks act as the cutting lines 33.

The scribing process is for cutting the upper and lower substrates constituting the liquid crystal panel with the liquid crystal injected between them. Typically, in the scribing process, the cutting lines 33 are formed in the outside of a region in which a sealant pattern 36 of the liquid crystal panel is formed.

At this time, locations on which the cutting lines 33 of the upper and lower substrates 30 and 31 are formed are different from each other in a region on which a pad 37 of the liquid crystal panel is formed, as shown in FIG. 3B. On the other hand, locations on which the cutting lines 33 of the upper and lower substrates 30 and 31 are formed are identical to each other in a region on which the pad 37 of the liquid crystal panel is not formed, as shown in FIG. 3A.

Subsequently, the liquid crystal panel is cut through a breaking process in FIG. 4 by using the cutting lines 33 along which the minute cracks are imprinted.

Figure 4:
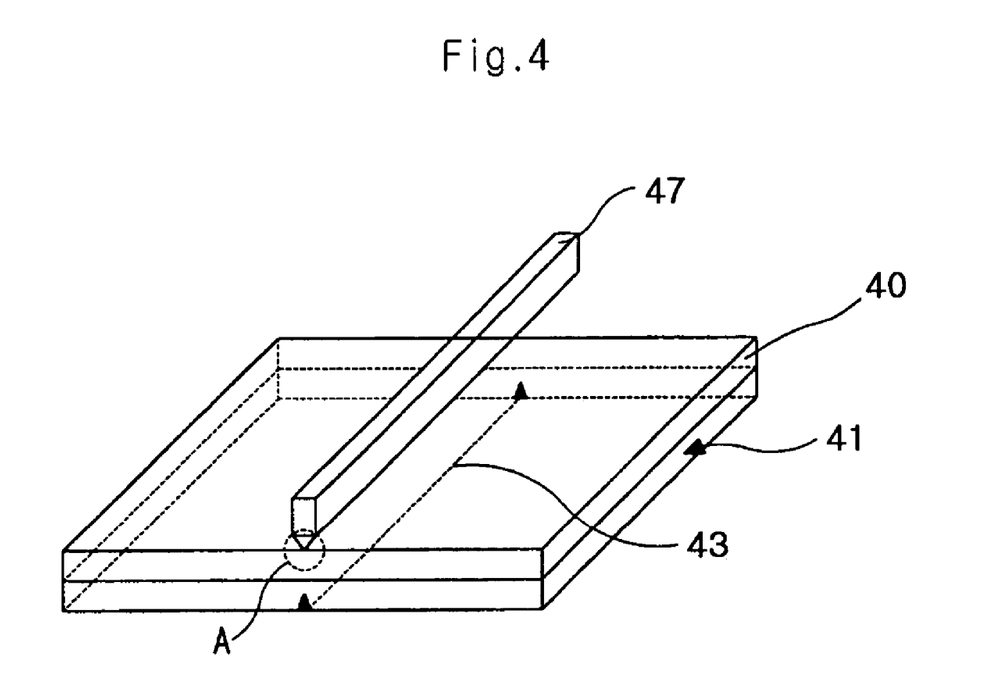
FIG. 4 is a schematic perspective view of a breaking process for the liquid crystal panel.

FIG. 4 is a schematic perspective view of a breaking process for the liquid crystal panel. In this process, a breaking bar 47 is placed on the upper and lower substrates 40 and 41 on which the cutting lines 43 are formed in the minute crack form through the above-described scribing process. Portion A of the breaking bar 47 which makes a direct contact with the surface of the upper substrate 30 is as hard as urethane rubber, but the breaking bar is made of a material which does not scratch the surface of the liquid crystal panel.

When the breaking bar 47 is precisely placed on the cutting lines 43 and applied with an instantaneous force, the liquid crystal panel is cut as the cutting lines 43 are broken.

Under current technologies, the upper and lower substrates of asymmetrical sizes are being formed on the large-sized mother glass substrate for the purpose of a maximum efficient use of area, instead of the upper and lower substrate of uniform size. In forming the upper and lower of asymmetrical sizes, the cutting lines are asymmetrically formed in the scribing process, thereby resulting in secondary dummy glass substrates (i.e. smaller than main substrates) having a width less than about 3 mm as well as the main dummy glass substrates.

Figure 5:
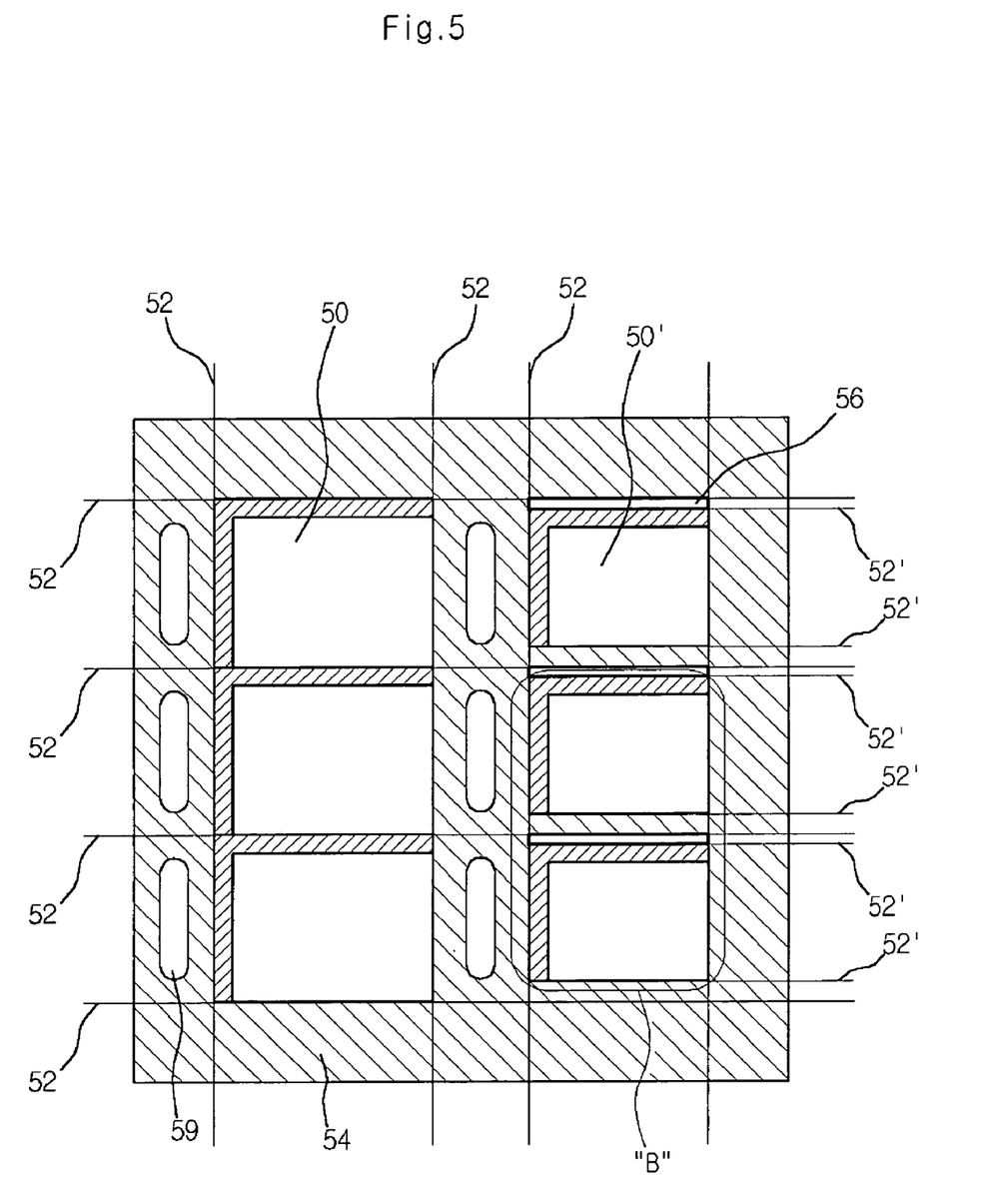
FIG. 5 is a plane view showing a mother substrate including upper and lower substrates having asymmetrical cutting lines bonded to each other.

FIG. 5 is a plane view showing a mother glass substrate including upper and lower substrates having asymmetrical cutting lines bonded to each other.

Referring to FIG. 5, a plurality of liquid crystal panels 50 having upper and lower substrates are formed on the left side of the large-sized mother glass substrate and a plurality of liquid crystal panels 50' having upper and lower substrates of smaller sizes are formed on the right side of the mother glass substrate.

In order to cut such an asymmetrical liquid crystal panel, the scribing process and the breaking process described above should be performed. In addition, in order to cut the liquid crystal panels 50' having smaller sizes, additional cutting lines 52' are required in addition to the typical cutting lines 52.

The additional cutting lines 52' produce secondary dummy glass substrates 56 having a width less than about 3 mm as well as the main glass substrate 54. More specifically, in FIG. 5, the secondary dummy glass substrates 56 are separated by the cutting lines 52, formed to cut the liquid crystal panels 50 on the left side of the glass substrate, and the additional cutting lines 52' formed to cut the liquid crystal panels 50' on the right side of the glass substrate.

Typically, as described above, sealant patterns 58 are formed on the main dummy glass substrate 54 of the large-sized mother glass substrate on which the upper and lower substrates are formed. Sealant patterns 58 (shown in FIG. 6A) are used to stably attach the large-sized mother glass substrates including the upper and lower substrates, which are collectively referred to as a dummy sealant pattern.

Figure 6A:
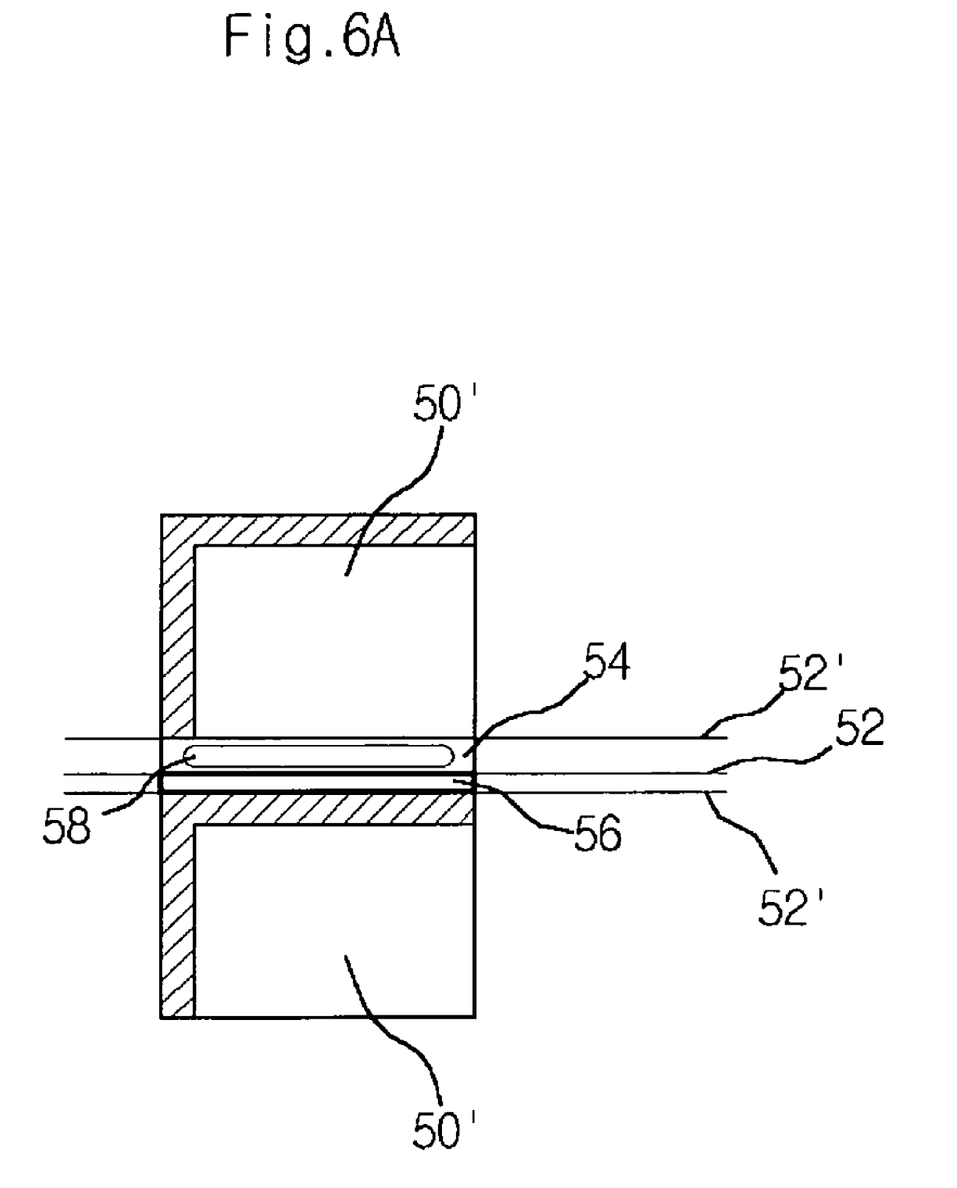
FIGS. 6A and 6B are an enlarged view of portion B and a view showing a state after cutting portion B in FIG. 5, respectively.
Figure 6B:
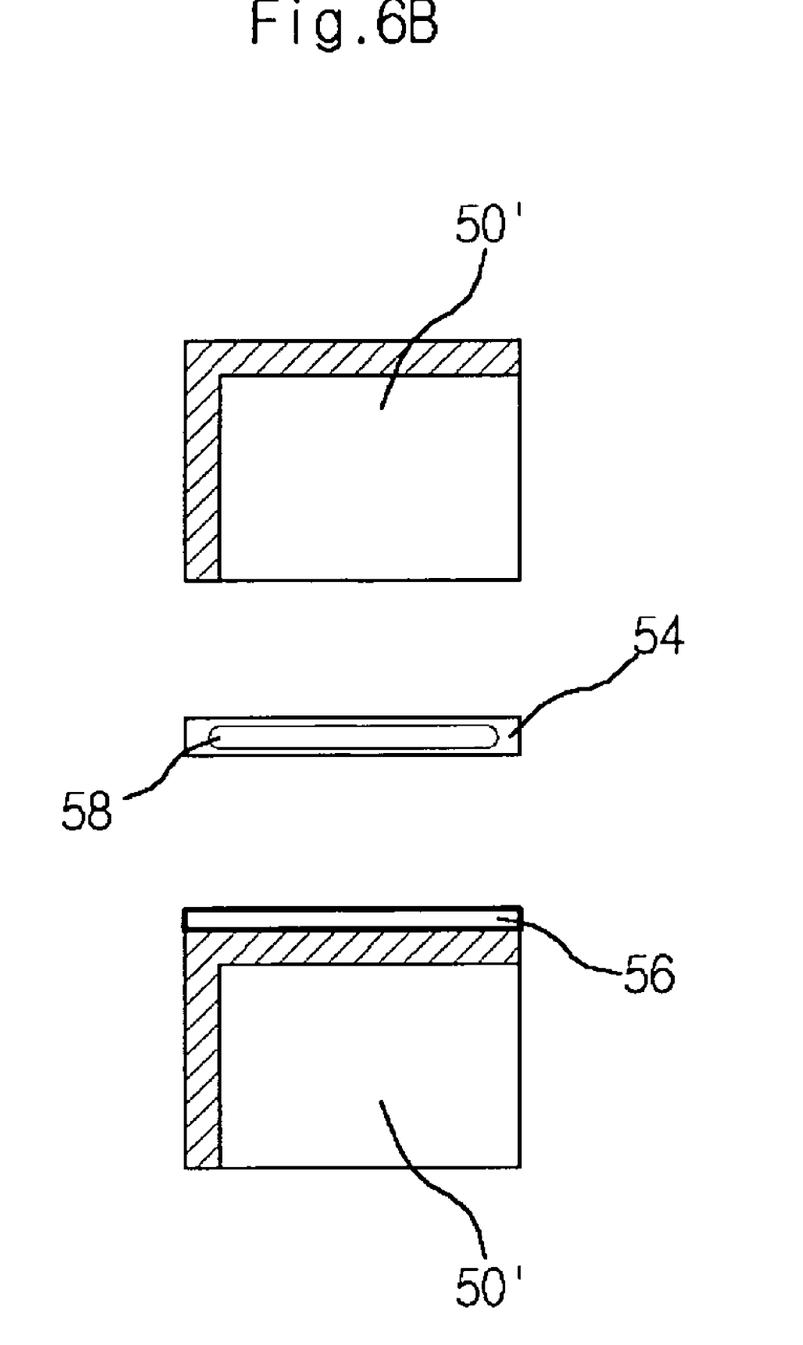

FIGS. 6A and 6B are an enlarged view of portion B and a view showing a state after cutting portion B in FIG. 5, respectively.

Referring to FIG. 6A, the dummy sealant pattern 58 is formed on the main dummy glass substrate 54 of the large-sized glass substrate but not formed on the secondary dummy glass substrate 56.

In addition, since the width of the secondary dummy glass substrate 56 is less than about 3 mm, the liquid crystal panels 50' are separated only by the cutting line 52' formed through the scribing process without using the breaking bar in the breaking process.

In this case, cracking marks may be not completely imprinted since weight of the scribing wheel is not properly delivered to the secondary dummy glass substrate 56 due to its small size, when the cutting line 52' is formed through the scribing process of the secondary dummy glass substrate 56. Due to its light weight, when the secondary dummy glass substrate 56 is separated from the liquid crystal panels 50', the liquid crystal panels 50' may be separated while having the secondary dummy glass substrate 56 attached thereto.

FIG. 6B shows that the secondary dummy glass substrate 56 is attached to the liquid crystal panel 50' and only the main dummy glass substrate 54 adjacent to the secondary dummy glass substrate 56 is separated from the liquid crystal panel 50'. In this case, the productivity of the liquid crystal panel becomes lower due to an improper separation between the secondary dummy glass substrate 56 and the liquid crystal panel 50'.

In order to overcome this problem, in the present invention, the dummy sealant pattern is formed not only on the main dummy glass substrate of the large-sized mother glass substrate but also on the secondary dummy glass substrate of the large-sized glass substrate.

This is attained by forming the dummy sealant pattern on the main dummy glass substrate to overlap the dummy sealant pattern with a portion under the cutting line between the secondary dummy glass substrate and the main dummy glass substrate.

This allows the small dummy glass substrate to be separated along with the main dummy glass substrate by using the overlapped dummy sealant pattern, which is capable of overcoming the problem of low productivity in the liquid crystal panel resulting from an improper separation between the secondary dummy glass substrate and the liquid crystal panel.

In other words, since the secondary dummy glass substrate in combination with the main dummy glass substrate serves as one large dummy glass substrate due to the dummy sealant pattern, the formation of cracks and the separation of the liquid crystal panel can be properly accomplished when cutting the liquid crystal panel.

Consequently, the present invention is characterized in that the liquid crystal panel is cut and separated by the cell cutting process (i.e., the scribing process and the breaking process) in the fabrication method of-the general liquid crystal panel.

Figure 7A:
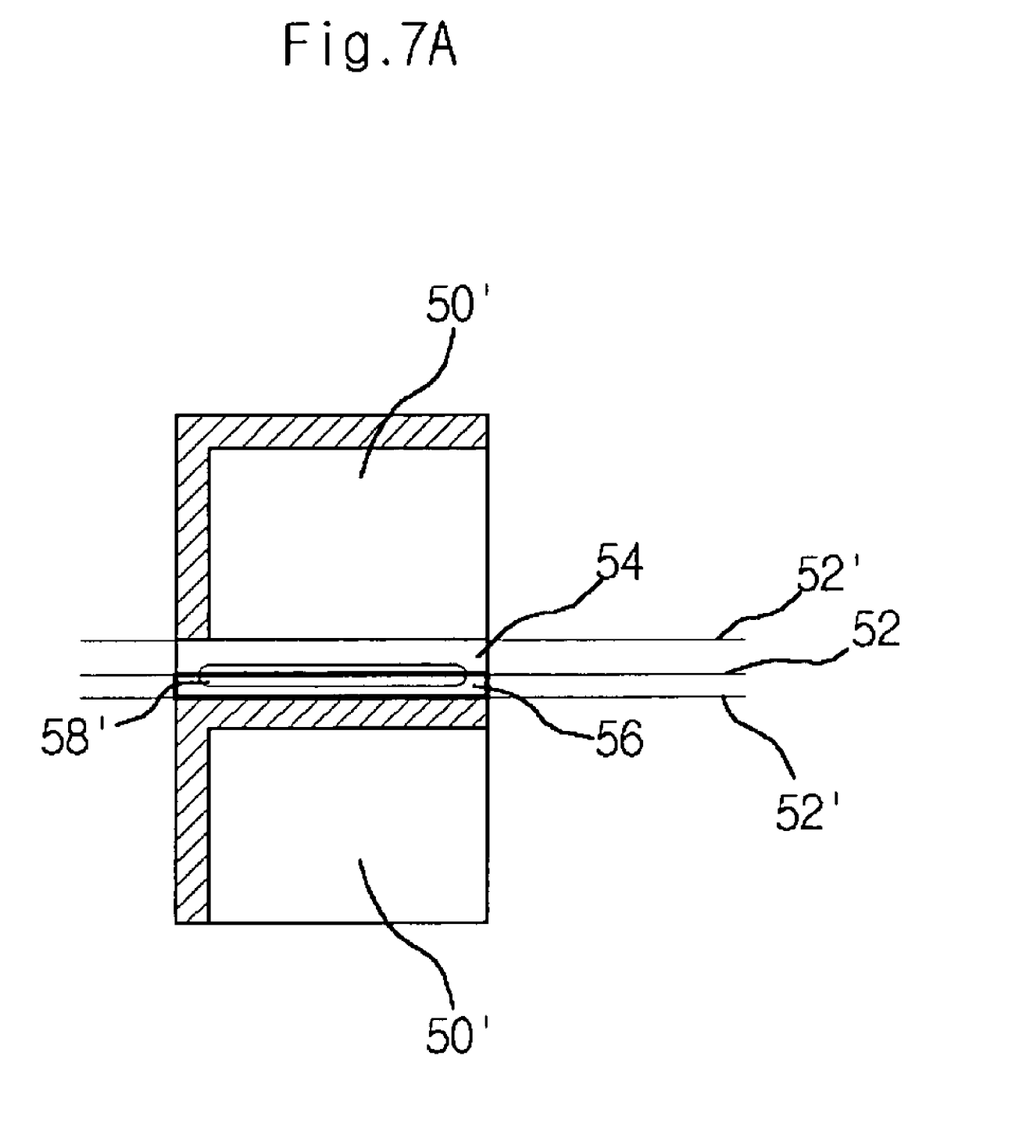
FIGS. 7A and 7B are an enlarged view of a portion in which the dummy sealant pattern is formed and a view showing a state after cutting the portion, respectively, according to the present invention.
Figure 7B:
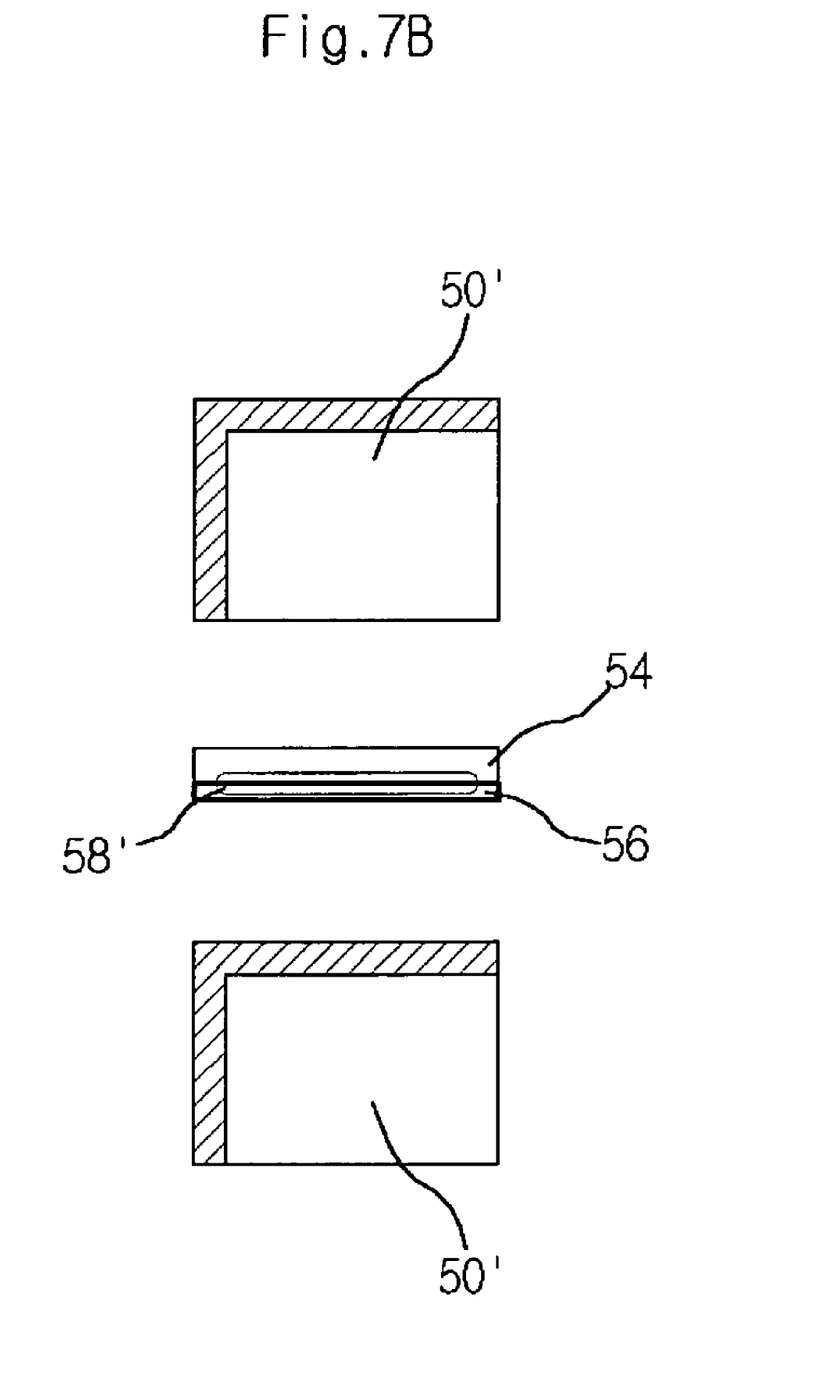

FIGS. 7A and 7B are an enlarged view of a portion in which the dummy sealant pattern is formed and a view showing a state after cutting the portion, respectively, according to the present invention.

Referring to FIG. 7A, in the large-sized mother glass substrate on which the upper and lower substrates having the asymmetrical cutting lines 52 and 52', shown in FIG. 5, are attached to each other, an enlarged view of a portion in which the dummy sealant pattern 58' is formed according to the present invention is illustrated herein.

As shown in FIG. 7A, the dummy sealant pattern 58' overlaps with a portion under the cutting lines 52 formed between the main dummy glass substrate 54 and the small dummy glass substrate 56 of the large-sized mother glass substrate.

However, the width of the dummy sealant pattern 58' should be maintained such that the main dummy glass substrate 54 and the secondary dummy glass substrate 56 serve as one large dummy substrate. For a portion where the secondary dummy glass substrate 56 is not formed, a dummy sealant pattern (not shown) is formed on the main dummy glass substrate 54.

In addition, as described earlier, since the small dummy glass substrate 56 is a secondary glass substrate having a width less than about 3 mm, it is separated by using only the cutting lines 52' formed in the scribing process without using the breaking bar in the breaking process.

Accordingly, if the dummy sealant pattern 58' is not formed on the secondary dummy glass substrate 56 of the large-sized mother glass substrate, the liquid crystal panels 50' can be separated while having the secondary dummy glass substrate 56 attached thereto. This may be resolved by forming the dummy sealant pattern 58' to be overlapped with a portion under the cutting lines 52' formed between the secondary dummy glass substrate 56 and the main dummy glass substrate 54.

In other words, the secondary dummy glass substrate 56 is separated along with the main dummy glass substrate 54 by means of the overlapped dummy sealant pattern 58', thereby preventing the deterioration in productivity of the liquid crystal panel caused by an improper separation between the secondary dummy glass substrate 56 and the liquid crystal panels 50'.

More specifically, since the secondary dummy glass substrate 56 in combination with the main dummy glass substrate 54 serves as one large dummy glass substrate by means of the dummy sealant pattern 58', the secondary dummy glass substrate 56 can be easily separated from the liquid crystal panels 50' when cutting the liquid crystal panels 50'.

FIG. 7B shows that the secondary dummy glass substrate 56 and the dummy glass substrate 54 are connected to each other by the overlapped dummy sealant pattern 58', and that the main dummy glass substrate 54 and the secondary dummy glass substrate 56 serving as one large dummy glass substrate 54 through such a connection are separated from the liquid crystal panels 50'.

Accordingly, the deterioration in productivity of the liquid crystal panel caused by an inappropriate separation between the secondary dummy glass substrate 56 and the liquid crystal panels 50' can be prevented.

As described above, in the fabrication method of the liquid crystal display panel according to the present invention, by overlapping the dummy sealant pattern with a portion under the cutting lines formed between the secondary dummy glass substrate and the main dummy glass substrate, the secondary dummy glass substrate is separated along with the main dummy glass substrate. This can prevent the productivity of the liquid crystal panel from being deteriorated due to an inappropriate separation between the secondary dummy glass substrate 56 and the liquid crystal panel.

It will be apparent to those skilled in the art that various modifications and variations can be made in the fabrication method of the liquid crystal display panel of the present invention without departing from the spirit or scope of the inventions. Thus, it is intended that the present invention covers the modifications and variations of this invention provided they come within the scope of the appended claims and their equivalents.

What is claimed is:

1. A method of fabricating liquid crystal display (LCD) panels, comprising:

forming a plurality of upper LCD panel sections having at least two different sizes on a first mother substrate and a plurality of lower LCD panel sections having at least two different sizes on a second mother substrate;

forming sealant patterns on at least one of the mother substrates;

attaching the first and second mother substrates to each other to bond the upper LCD panel sections with associated ones of the lower LCD panel sections to form at least first and second LCD panel units;

forming at least first cutting lines on each of the first and second mother substrates, the first cutting lines corresponding to a boundary of the first LCD panel unit, wherein the first cutting lines extend over at least one sealant pattern;

forming at least second cutting lines on each of the first and second mother substrates, the second cutting lines corresponding to a boundary of the second LCD panel unit; and separating the first and second LCD panel units into individual LCD panels, wherein the first LCD panel unit is larger than the second LCD panel unit, wherein each of the first and second mother substrates includes a plurality of dummy sections, each dummy section including a main dummy portion and a secondary dummy portion, and at least one of the sealant patterns under the first cutting lines binds the main dummy portions and secondary dummy portions together during the separating step.

2. The method according to claim 1, wherein the secondary dummy portions have a width of less than about 3 mm.

3. The method according to claim 1, wherein the sealant patterns are formed on non-display regions of the LCD panels.

4. The method according to claim 1, wherein the sealant patterns are positioned on both the main dummy portions and the secondary dummy portions.

5. The method according to claim 1, wherein sizes of the upper LCD panel sections on the first mother substrate and the lower LCD panel sections on the second mother substrate facing correspondingly at each other are substantially the same.

6. The method according to claim 1, wherein the lower LCD panel sections have a plurality of thin film transistors and a plurality of pixel electrodes, and the upper LCD panel sections have a plurality of color filters and a common electrode.

7. The method according to claim 1, further comprising injecting liquid crystals into the separated LCD panels.

8. A method of fabricating liquid crystal display (LCD) panels, comprising:

forming a plurality of upper LCD panel sections having at least two different sizes on a first mother substrate and a plurality of lower LCD panel sections having at least two different sizes on a second mother substrate;

forming sealant patterns on at least one of the mother substrates;

attaching the first and second mother substrates to each other to bond the upper LCD panel sections with associated ones of the lower LCD panel sections to form at least first and second LCD panel units;

forming at least first and second cutting lines on each of the first and second mother substrates; and separating the first and second LCD panel units into individual LCD panels having different sizes, wherein remnants of the separated mother substrates include main dummy portions and secondary dummy portions divided by the first cutting lines therebetween, and at least one of the sealant patterns is located underneath the first cutting lines such that at least one of the sealant patterns under the first cutting lines bind the main dummy portions and secondary dummy portions together during the separating step.

9. The method according to claim 8, further comprising injecting liquid crystals into the separated LCD panels.

10. The method according to claim 8, wherein the secondary dummy portions have a width of less than about 3 mm.

11. The method according to claim 8, wherein sizes of the upper LCD panel sections on the first mother substrate and the lower LCD panel sections on the second mother substrate facing correspondingly at each other are substantially the same.

12. The method according to claim 8, wherein the lower LCD panel sections have a plurality of thin film transistors and a plurality of pixel electrodes, and the upper LCD panel sections have a plurality of color filters and a common electrode.

13. A method of fabricating liquid crystal display (LCD) panels, comprising:

forming a plurality of upper LCD panel sections on a first substrate and a plurality of lower LCD panel sections on a second substrate;

forming sealant patterns extending in a first direction on at least one of the substrates;

attaching the first and second substrates to each other to bond the upper LCD panel sections with associated ones of the lower LCD panel sections to form at least first and second LCD panel units;

forming a first set of cutting lines substantially in the first direction on each of the first and second substrates, the first set of cutting lines spanning the entire width of the first and second substrates and corresponding to a boundary of the first LCD panel unit, wherein the first set of cutting lines extend directly over at least one sealant pattern;

forming a second set of cutting lines substantially in the first direction on each of the first and second mother substrates, the second set of cutting lines spanning only a portion of the first and second substrates and corresponding to a boundary of the second LCD panel; and separating the first and second LCD panel units into individual LCD panels, wherein remnants of the first and second substrates include at least one main dummy portion and at least one secondary dummy portion divided by the first set of cutting lines therebetween, and at least one of the sealant patterns under the first set of cutting lines binds the main dummy portion and secondary dummy portion together during the separating step.

14. The method according to claim 13, wherein the first LCD panel unit is larger than the second LCD panel unit, the main dummy portion and the secondary dummy portion being formed between a plurality of second LCD panel units.

* * * * *